(12) United States Patent
Bilonenko et al.

(10) Patent No.: US 12,517,507 B2
(45) Date of Patent: Jan. 6, 2026

(54) SYSTEMS AND METHODS FOR FLEET MANAGEMENT ASSOCIATED WITH REMOTE DRIVING SYSTEMS

(71) Applicant: Vay Technology GmbH, Berlin (DE)

(72) Inventors: Volodymyr Bilonenko, Berlin (DE); Stanislav Borysov, Berlin (DE); Kiril Vuchkov, Sofia (BG); Daniel Buchmueller, Truckee, CA (US); Mariana Avezum, Munich (DE); Thomas von der Ohe, Berlin (DE)

(73) Assignee: Vay Technology GmbH, Berlin (DE)

( * ) Notice: Subject to any disclaimer, the term of this patent is extended or adjusted under 35 U.S.C. 154(b) by 356 days.

(21) Appl. No.: 17/956,101

(22) Filed: Sep. 29, 2022

(65) Prior Publication Data
US 2024/0111284 A1    Apr. 4, 2024

(51) Int. Cl.
*G05D 1/00* (2024.01)
*G06Q 10/0631* (2023.01)
*G06Q 10/0639* (2023.01)

(52) U.S. Cl.
CPC ......... *G05D 1/0027* (2013.01); *G05D 1/0038* (2013.01); *G05D 1/0291* (2013.01); *G06Q 10/06316* (2013.01); *G06Q 10/06398* (2013.01)

(58) Field of Classification Search
CPC .. G05D 1/0027; G05D 1/0038; G05D 1/0291; G05D 1/2279; G08G 1/202
See application file for complete search history.

(56) References Cited

U.S. PATENT DOCUMENTS

| | | | |
|---|---|---|---|
| 2019/0137290 A1* | 5/2019 | Levy | B60Q 1/507 |
| 2020/0062267 A1 | 2/2020 | Magzimof et al. | |
| 2020/0377128 A1 | 12/2020 | Marczuk et al. | |
| 2021/0094567 A1* | 4/2021 | Imai | B60W 60/001 |
| 2022/0051165 A1 | 2/2022 | Clément et al. | |
| 2022/0063660 A1* | 3/2022 | Poulet | B60W 60/005 |
| 2022/0244058 A1 | 8/2022 | Cong et al. | |
| 2023/0057919 A1* | 2/2023 | Takashima | B60W 10/18 |
| 2023/0132029 A1* | 4/2023 | Gao | G05D 1/0011 |
| | | | 701/24 |
| 2023/0409025 A1* | 12/2023 | Donderici | G05D 1/222 |

OTHER PUBLICATIONS

International Search Report and Written Opinion mailed Jan. 3, 2024 in corresponding International Application No. PCT/EP2023/076802.

* cited by examiner

*Primary Examiner* — Toya Pettiegrew
(74) *Attorney, Agent, or Firm* — Athorus, PLLC (57) ABSTRACT

Systems and methods for fleet management of remote driving systems may include a plurality of vehicles and a plurality of teleoperators. A fleet management system may receive a plurality of tasks, and may generate or optimize assignment or allocation of the plurality of tasks to various combinations of the vehicles and teleoperators. Because the teleoperators are decoupled from the vehicles, and because the teleoperators may be dynamically coupled to vehicles via network connections to remotely operate vehicles, performance of the plurality of tasks may be optimized to improve cost, time, and efficiency associated with fleet management of remote driving systems.

19 Claims, 8 Drawing Sheets

SYSTEMS AND METHODS FOR FLEET MANAGEMENT ASSOCIATED WITH REMOTE DRIVING SYSTEMS

BACKGROUND

Teleoperated remote driving of a vehicle may be considered a transient technology toward fully autonomous driving. In such remote driving operations, a teleoperator may use a teleoperator station to remotely drive the vehicle via a wireless communication network. To facilitate such remote driving operations, a plurality of vehicles and a plurality of teleoperators may need to be coordinated and instructed to perform a plurality of tasks, jobs, or operations. Accordingly, there is a need for systems and methods to manage fleets of vehicles and fleets of teleoperators to enable safe, efficient, and reliable performance of various tasks using remote driving systems.

DETAILED DESCRIPTION

As is set forth in greater detail below, implementations of the present disclosure are directed to systems and methods to manage fleets of vehicles and fleets of teleoperators, e.g., using one or more fleet management or control systems, to enable safe, efficient, and reliable performance of various tasks using remote driving systems or applications.

In example embodiments of remote driving systems or applications, a teleoperator may use a teleoperator station to remotely drive a vehicle within an environment via a wireless communication network. One or more imaging devices or sensors associated with the vehicle may capture a live video stream representing a view of the vehicle's environment. The live video stream may then be transmitted, processed, and presented to a teleoperator at the teleoperator station. At the teleoperator station, the teleoperator may view the live video stream and remotely drive the vehicle by using a control interface of the teleoperator station to generate drive control commands. Then, the drive control commands may be processed and transmitted from the teleoperator station to the vehicle, and the vehicle may receive, process, and execute the drive control commands.

In addition, the vehicle may include various other types of sensors to capture data associated with the environment, such as audio sensors, depth sensors, infrared sensors, other types of imaging sensors, radar sensors, light detection and ranging (LIDAR) sensors, other types of time-of-flight sensors, and/or various other types of sensors. Various data captured by one or more sensors onboard the vehicle may be provided, presented, or emitted for the teleoperator to facilitate safe and reliable remote operation of vehicles.

In example embodiments, a remote driving system may include a plurality of vehicles, a plurality of teleoperators, and one or more fleet management or control systems. The plurality of vehicles may be positioned at respective vehicle locations in various regions or areas within an environment. The plurality of teleoperators may be positioned at respective teleoperator stations, which may be remote from the vehicle locations of the plurality of vehicles.

In addition, the one or more fleet management or control systems may control, coordinate, and/or instruct performance of a plurality of tasks by the plurality of teleoperators with respect to the plurality of vehicles. The plurality of tasks may comprise various types of tasks, such as driving to customer locations, driving to destination locations, driving to parking or storage locations, driving to power or fuel replenishment stations, driving to repair or maintenance locations, rebalancing one or more vehicles of the fleet within the environment, and/or various other tasks.

In example embodiments, the fleet management or control systems may select a teleoperator and a vehicle for performance of a desired task. Then, the teleoperator may connect or establish a communication connection with the vehicle via a network, and perform the desired task with respect to the vehicle. Upon completion of the task, the teleoperator may disconnect or end a communication connection with the vehicle.

In this manner, the fleet management or control systems may coordinate, organize, and/or optimize the performance of a plurality of tasks by the plurality of teleoperators with respect to the plurality of vehicles. By coordinating and instructing fleets of teleoperators and fleets of vehicles that are remote from each other, a plurality of tasks may be performed in a safe, reliable, and efficient manner, particularly in comparison to conventional vehicle fleet management processes that are generally constrained by one-to-one relationships between a vehicle and a driver who must be physically present within the vehicle.

Figure 1:
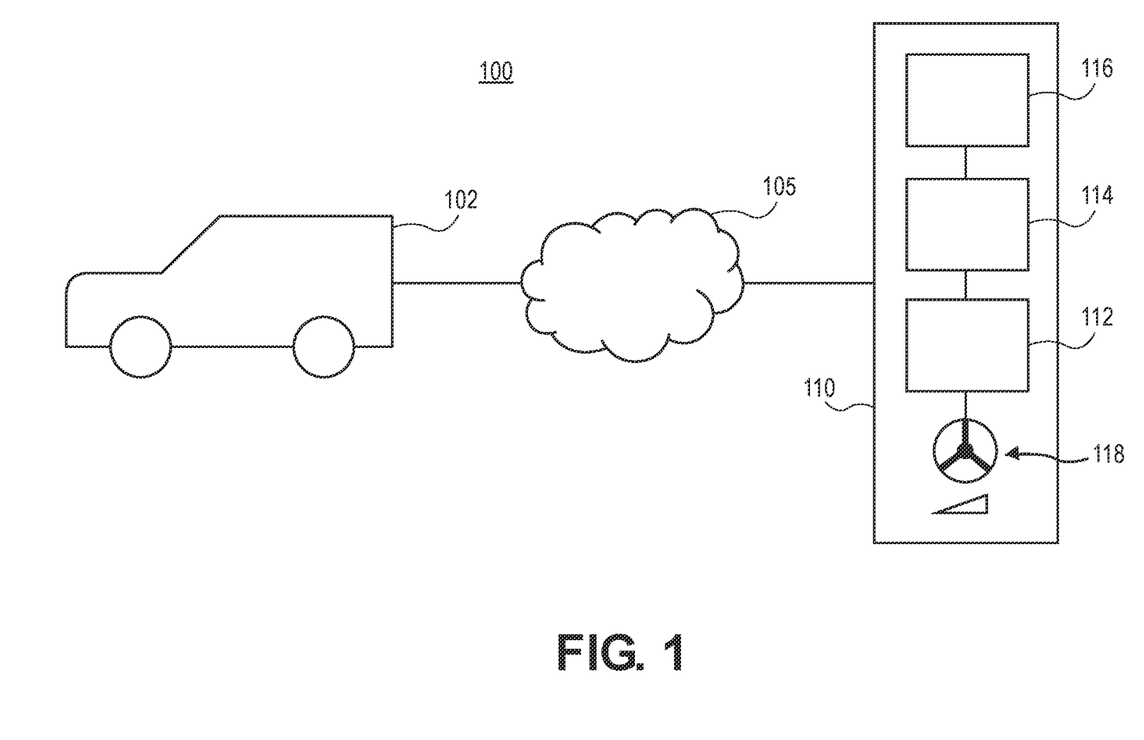
FIG. 1 is a schematic diagram of an example remote driving system, in accordance with implementations of the present disclosure.

FIG. 1 is a schematic diagram 100 of an example remote driving system, in accordance with implementations of the present disclosure.

As shown in FIG. 1, the example remote driving system may comprise a vehicle 102 that is adapted to be remotely driven, controlled, or instructed by a teleoperator via a wireless communication network 105. In addition, the example remote driving system may comprise a teleoperator station 110 for use by a teleoperator to remotely drive, control, or instruct the vehicle 102 via the wireless communication network 105.

In example embodiments, the vehicle 102 may comprise a car, such as a small car, a regular car, a Sports Utility Vehicle (SUV), a van, a truck, or any other type of vehicle that is adapted to be remotely driven, controlled, or instructed. In addition, the vehicle 102 may comprise a modified vehicle that includes or provides the required on-board infrastructure for teleoperation. For example, the vehicle 102 may include actuators for controlling the vehicle 102, one or more imaging devices, cameras, or sensors for capturing imaging data of the vehicle's environment, one or more audio sensors or arrays, radar sensors, LIDAR sensors, or other types of sensors for detecting or capturing data associated with the vehicle's environment, one or more sensors to detect or measure drive state information, and/or various interfaces for bi-directional communication with the teleoperator station 110 and/or a fleet management or control system via the wireless communication network 105.

The actuators for controlling the vehicle 102 may include mechanical actuators that directly actuate the vehicle's steering wheel, acceleration pedal, brakes, and/or other systems or components of the vehicle 102. Alternatively, existing actuators of the vehicle 102 (e.g., for adjusting or controlling speed, acceleration, steering angle, and/or other operational characteristics) may be controlled via an electronic interface associated with the vehicle 102.

The imaging devices or cameras associated with the vehicle 102 may comprise various types of imaging sensors, analog cameras, digital cameras, video cameras, depth sensors, infrared sensors, time-of-flight sensors, or other types of imaging sensors. The imaging devices or cameras may be positioned and oriented at various positions on the vehicle 102 in order to capture imaging data of an environment at least partially around the vehicle 102, e.g., towards a forward movement direction, towards a rearward movement direction, and/or toward various other portions of a periphery of the vehicle 102. In addition, the imaging devices or cameras may capture imaging data, such as video data, live video streams, or other types of imaging data, which may be transmitted to the teleoperator station 110 and used to provide environment awareness and ensure safe and reliable remote driving operations.

The sensors to detect or measure drive state information of the vehicle 102 may comprise various types of sensors configured to detect speed, acceleration, steering angle, yaw rate, steering torque, and/or other operational characteristics of the vehicle 102. For example, a first sensor such as a speedometer or encoder may measure a drive speed of the vehicle 102, a second sensor such as an accelerometer, pressure sensor, or encoder may measure pedal actuation, acceleration, deceleration, or braking of the vehicle 102, and/or a third sensor such as an encoder or position/orientation sensor may measure a steering angle, yaw rate, steering torque, and/or measure an orientation of the vehicle wheels. The drive state information of the vehicle 102 may be transmitted to the teleoperator station 110, and may be used to facilitate safe and reliable remote driving operations.

The interfaces for bi-directional communication with the teleoperator station 110 and/or a fleet management or control system may enable transmission of imaging data, audio data, other sensor data, location data, vehicle data, various other data, as well as transmission of drive state information associated with the vehicle 102, from the vehicle 102 to the teleoperator station 110 and/or a fleet management or control system via the wireless communication network 105. In addition, the interfaces for bi-directional communication with the teleoperator station 110 and/or a fleet management or control system may enable receipt of task information, connection requests, drive control commands, partially or substantially fully autonomous drive commands or instructions, and/or other data, information, commands, or instructions from the teleoperator station 110 and/or a fleet management or control system via the wireless communication network 105.

In example embodiments, the wireless communication network 105 may comprise a network that allows for bi-directional transmission of data between the vehicle 102, the teleoperator station 110, and/or a fleet management or control system. For example, the network 105 may be a fourth generation (4G) wireless communication network, a fifth generation (5G) wireless communication network, or other types of wireless communication networks.

Various data or information may be transmitted via the network 105, including imaging data, audio data, other sensor data, location data, vehicle data, drive state information, and/or various other data associated with the vehicle 102, e.g., from the vehicle 102 to the teleoperator station 110 and/or a fleet management or control system, as well as task information, connection requests, drive control commands, partially or substantially fully autonomous drive commands or instructions, and/or other data, information, commands, or instructions, e.g., from the teleoperator station 110 and/or a fleet management or control system to the vehicle 102 via the wireless communication network 105. The drive state information may comprise data or information related to speed, acceleration, steering angle, yaw rate, steering torque, and/or other operational data or characteristics associated with the vehicle 102. In addition, additional data may be exchanged between the vehicle 102, the teleoperator station 110, and/or a fleet management or control system, such as time synchronization information including data transmission timestamps.

In example embodiments, the teleoperator station 110 may comprise a communication unit 112 configured to send and receive data or information to and from the vehicle 102 and/or a fleet management or control system via the network 105, a processor or processing unit 114 configured to process various data to facilitate safe and reliable remote driving operations, a presentation or display device 116 configured to present, emit, or provide the imaging data and/or other indicators or feedback to a teleoperator using the teleoperator station 110, and a control interface 118 configured to receive drive control commands and/or other inputs or instructions from the teleoperator using the teleoperator station 110.

The communication unit 112 may comprise various types of communication systems, devices, antenna, interfaces, or other data transmit/receive units configured to enable wireless communication between the teleoperator station 110, the vehicle 102, and/or a fleet management or control system via the wireless communication network 105. As described herein, the communication unit 112 may receive imaging data, audio data, other sensor data, location data, vehicle data, drive state information, task information, connection requests, and/or various other data from the vehicle 102 and/or a fleet management or control system, and may transmit task information, connection requests, drive control commands, partially or substantially fully autonomous drive commands or instructions, and/or other data to the vehicle 102 and/or a fleet management or control system.

The processor 114 may comprise a processing unit, graphics processing unit, or other types of processors configured to process the various data that is received and/or sent between the vehicle 102, teleoperator station 110, and/or a fleet management or control system via the network 105 to facilitate safe and reliable remote driving operations. In addition, the processor 114 may receive and process task information, connection requests, and/or drive control commands received from a teleoperator associated with the teleoperator station 110, such that various data or information can be transmitted to the vehicle 102 via the network 105 in order to remotely drive, control, or instruct various systems or components of the vehicle 102.

The presentation device 116 may comprise one or more monitors, screens, projectors, display devices, head-mounted displays, augmented reality displays, other types of presentation devices, speakers, audio output devices, haptic feedback or output devices, and/or other types of feedback or output devices. For example, the presentation device 116 may receive and present, render, or display the imaging data, e.g., video data or live video streams, received from the vehicle 102. In addition, the presentation device 116 may emit various indicators or feedback, e.g., visual, audio, haptic, or other types of feedback, to ensure safe and reliable remote driving operations. Further, the presentation device 116 may present, emit, or provide the various imaging data, visual indicators, audio feedback, haptic feedback, or other indicators, such that a teleoperator at the teleoperator station 110 may have an awareness of an environment around the vehicle 102 and maintain safe and reliable remote driving operations while driving, controlling, or instructing operations of the vehicle 102.

The control interface 118 may comprise a steering wheel, acceleration pedal, brake pedal, transmission selector, and/or various other interface components to generate drive control commands for the vehicle 102. In addition, the control interface 118 may include components, elements, or interfaces to control or instruct various other aspects of the vehicle 102, such as lights, turn indicators, windshield wipers, power windows, power doors, climate control systems, entertainment or infotainment systems, and/or various other systems, devices, or accessories associated with the vehicle 102. The control interface 118 may receive task information, connection requests, and/or drive control commands provided or input by a teleoperator at the teleoperator station 110, which may then be processed and/or transmitted to the vehicle 102 via the network 105.

Although FIG. 1 illustrates an example remote driving system having a particular number, type, configuration, and arrangement of various components, other example embodiments may include various other numbers, types, configurations, and arrangements of the various components. For example, one or more vehicles may be in communication with one or more teleoperator stations, various types of wireless communication networks may be used to facilitate communication between vehicles, teleoperator stations, and/or a fleet management or control system, and/or various other modifications may be made in other example embodiments of the example remote driving system.

Figure 2:
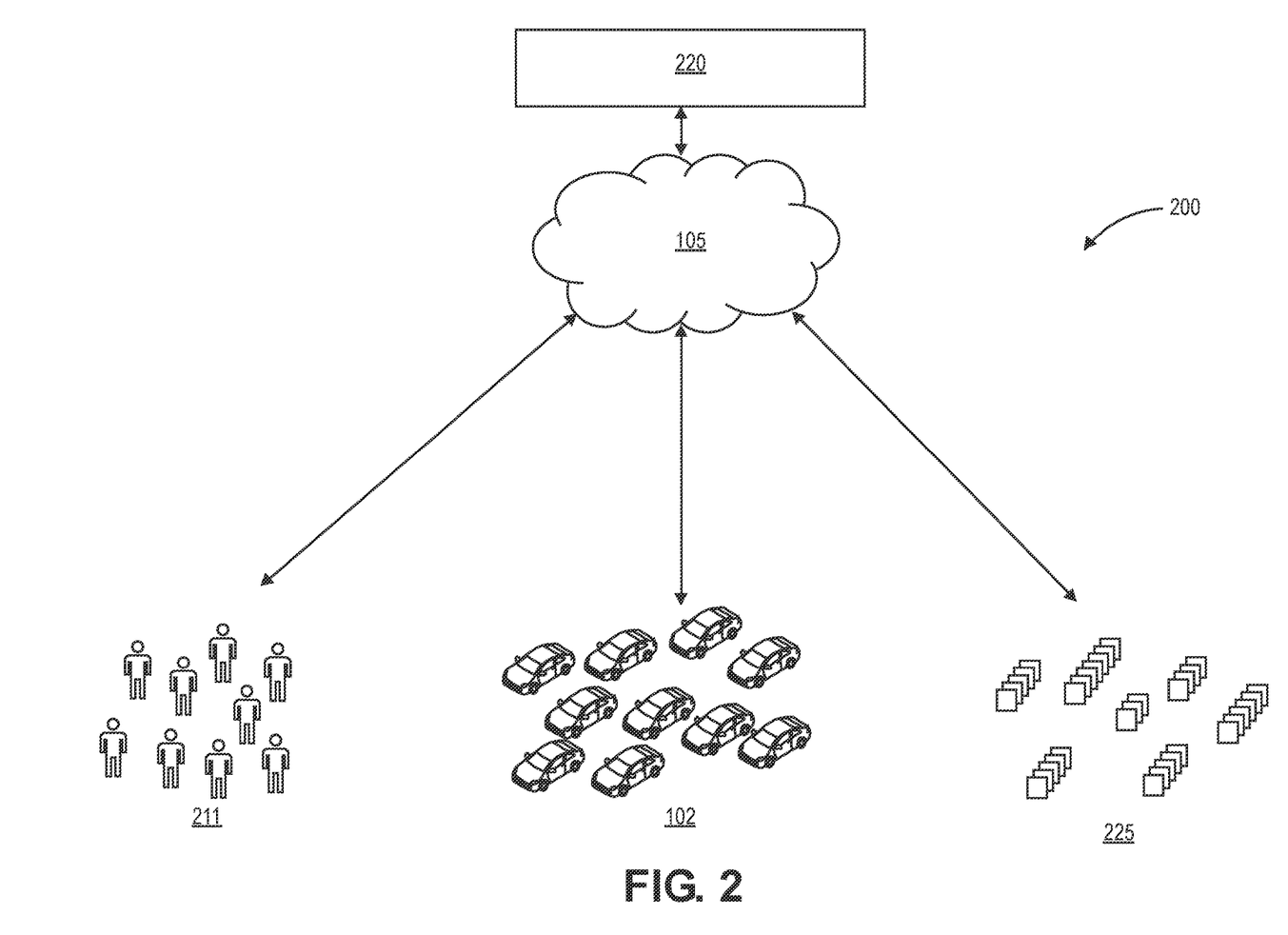
FIG. 2 is a schematic diagram of an example fleet management system for remote driving systems, in accordance with implementations of the present disclosure.

FIG. 2 is a schematic diagram 200 of an example fleet management system for remote driving systems, in accordance with implementations of the present disclosure.

As shown in FIG. 2, a remote driving system may include a plurality of vehicles 102, a plurality of teleoperators 211, a plurality of tasks 225, and a fleet management or control system 220 that is in communication therewith via a wireless communication network 105. The example remote driving system of FIG. 1 may comprise a portion of the remote driving system shown and described with respect to FIG. 2.

In example embodiments, the plurality of vehicles 102 may comprise different types of vehicles having different capabilities, such as speed, acceleration, turning radius, front wheel drive, rear wheel drive, all-wheel drive, off-road package, combustion engine, electric propulsion, passenger capacity, cargo capacity, range, passenger vehicle, commercial vehicle, and/or other aspects. In addition, the plurality of vehicles 102 may be positioned at respective vehicle locations within an environment. For example, the plurality of vehicles 102 may be positioned in different regions, areas, or zones within an environment, as further described herein at least with respect to FIG. 3.

In example embodiments, the plurality of teleoperators 211 may comprise various different individuals, employees, contractors, or other human operators having different qualifications, such as operating licenses or certifications associated with different regions, areas, zones, passenger vehicles, taxi or livery vehicles, commercial vehicles, delivery vehicles, urban driving, off road driving, sedans, sport utility vehicles, trucks, and/or other aspects. In addition, the plurality of teleoperators 211 may be positioned at respective teleoperator stations within an environment. For example, the plurality of teleoperators 211 may also be positioned in different regions, areas, or zones within an environment, as further described herein at least with respect to FIG. 3. Further, the teleoperator stations associated with the plurality of teleoperators 211 may be remote from any or all vehicle locations of the plurality of vehicles 102.

In example embodiments, the plurality of tasks 225 may comprise various jobs, trips, operations, or other tasks to be completed with respect to one or more of the plurality of vehicles 102. The plurality of tasks 225 may generally comprise remote driving operations, such as driving to a customer location, driving to a pickup location, picking up a customer, picking up a package or item for delivery or return, driving to a destination location, dropping off a customer, dropping off a package or item, driving to a parking or storage location, driving to a power replenishment location, driving to a repair or maintenance location, driving to rebalance or distribute one or more vehicles within an environment, driving between any of a plurality of locations, and/or various other remote driving operations.

In some example embodiments, the one or more tasks 225 may comprise parts or portions of a larger or more complete operation with respect to a vehicle, e.g., driving to a customer location, picking up a customer, driving the customer to a destination location, dropping off the customer, and driving to a parking or storage location. In example embodiments, the optimization of the assignment or allocation of tasks to various combinations of vehicles and teleoperators by a fleet management system may be improved or facilitated by generating tasks that comprise shorter and/or more discrete tasks. Such shorter and/or more discrete tasks may better leverage the dynamic remote coupling between teleoperators and vehicles. In contrast, longer tasks that more closely approximate larger or more complete driving operations may conceptually revert back to the one-to-one relationship of conventional fleet management systems in which a driver that must be physically present within and operating a vehicle, thereby reducing the overall efficiency that is possible using the remote driving systems described herein.

In further example embodiments, the one or more tasks 225 may also comprise partially or fully autonomous operations to be instructed, initiated, or performed by the vehicle, with or without teleoperator input or confirmation. For example, the partially or fully autonomous operations may include portions of various remote driving tasks, such as driving on portions of highways, freeways, or other types of roadways, parking operations or tasks, performing diagnostic tests or checks on a vehicle, various other types of tests, operations, or tasks while a vehicle is stationary, and/or other types of partially or fully autonomous operations.

As further described herein, the plurality of tasks 225 may be assigned or allocated to one or more of the plurality of teleoperators 211, even in cases where the plurality of tasks 225 form portions of a larger or more complete operation with respect to a single vehicle. Thus, multiple teleoperators 211 may remotely operate a single vehicle at different times in order to perform multiple tasks 225 over time.

In addition, a single teleoperator 211 may be assigned or allocated to perform various different tasks 225 with respect to one or more vehicles 102 over time. For example, a single teleoperator 211 may perform a first task 225 with respect to a first vehicle 102, and then later perform a second task 225 with respect to the same first vehicle 102. In addition, a single teleoperator 211 may perform a first task 225 with respect to a first vehicle 102, and then later perform a second task 225 with respect to a second vehicle 102.

In the example remote driving system described herein, the plurality of vehicles 102 and the plurality of teleoperators 211 are uncoupled from each other. Thus, a teleoperator 211 is not physically coupled to or positioned within a single vehicle 102, as in conventional fleet management systems. Because of the physical uncoupling between vehicles 102 and teleoperators 211, and further because of the dynamic remote coupling between vehicles 102 and teleoperators 211 via the wireless communication network 105, teleoperators 211 can potentially establish communication connections with and remotely operate any and all of the vehicles 102 at any time to perform various tasks 225. Therefore, the tasks 225 may be performed by the teleoperators 211 with respect to the vehicles 102 in a manner that does not require a driver to physically move to and operate a vehicle, thereby increasing the safety, reliability, and efficiency of fleet management systems described herein.

In example embodiments, the fleet management or control system 220 may comprise various processors, memories, applications, processing algorithms, communication devices, input/output devices, and/or other components to receive data associated with the plurality of vehicles 102, the plurality of teleoperators 211, and the plurality of tasks 225, and to process the data to coordinate, assign, allocate, and/or instruct performance of tasks 225 by teleoperators 211 with respect to vehicles 102. The fleet management system 220 may include various machine learning, neural network, or other types of data processing, load balancing, and/or optimization algorithms or techniques to generate and optimize the assignment or allocation of tasks 225 to various combinations of teleoperators 211 and vehicles 102. In some example embodiments, the assignment or allocation of tasks 225 may be optimized based on various factors, such as lowest cost, shortest time to completion, on-time completion, average time to completion, shortest waiting time, average waiting time, shortest travel distance, average travel distance, lowest fuel or power consumption, average fuel or power consumption, highest efficiency, average or aggregate efficiency, and/or various other factors. In additional example embodiments, the optimization of assignment or allocation of tasks 225 may be performed with respect to all combinations of vehicles, teleoperators, and tasks, one or more subsets of the vehicles, teleoperators, and tasks, and/or one or a few designated vehicles, teleoperators, and tasks.

The fleet management system 220 may receive the plurality of tasks 225 via the wireless communication network 105 from various sources, such as customers, individuals, clients, and/or other entities or systems, and may also communicate status or completion of such tasks via the network 105 back to the various sources. In addition, the fleet management system 220 may generate or maintain various tasks 225 with respect to management or maintenance of the vehicles 102, such as repair, replenishment, maintenance, storage, rebalancing, redistribution, or others, as well as management of the teleoperators 211, such as working hours, shifts, breaks, vacations, qualifications, certifications, or others.

Furthermore, the fleet management system 220 may communicate with the vehicles 102 and the teleoperators 211 via the wireless communication network 105. For example, the fleet management system 220 may receive various data from the vehicles 102, e.g., numbers, types, availability, capabilities, or other data, and may coordinate or instruct connections and completion of tasks for vehicles 102 by teleoperators 211. In addition, the fleet management system 220 may receive various data from the teleoperators 211 at teleoperator stations, e.g., numbers, availability, qualifications, or other data, and may coordinate or instruct connections and completion of tasks by teleoperators 211 for vehicles 102.

As a result, the fleet management system 220 may receive as inputs data associated with the plurality of vehicles 102, data associated with the plurality of teleoperators 211, and data associated with the plurality of tasks 225. Then, the fleet management system 220 may process the received data to coordinate and/or optimize completion of the tasks 225 by teleoperators 211 with respect to the vehicles 102. Further, the fleet management system 220 may assign or allocate the tasks 225 to individual teleoperators 211 who may then connect with and complete the allocated tasks 225 with respect to individual vehicles 102. Moreover, the fleet management system 220 may dynamically update or modify the assignment or allocation of tasks 225 based on changes to the various received data over time, such as completed tasks, new tasks, canceled tasks, other changes to tasks, available vehicles, unavailable vehicles, other changes to vehicles, available teleoperators, unavailable teleoperators, other changes to teleoperators, and/or various other changes to the received data.

In addition to determining various combinations of teleoperators and vehicles to perform tasks, the fleet management system 220 may also process the received data to determine or generate a schedule or order in which the various tasks are to be instructed and performed by the various combinations of teleoperators and vehicles. Thus, the fleet management system 220 may assign, allocate, or instruct performance of tasks by various combinations of teleoperators and vehicles at designated times and/or in determined orders or sequences. As described herein, the determination of various combinations of teleoperators and vehicles to perform tasks, as well as the determination of a schedule, order, or sequence for performance of the tasks may be optimized based on one or more of various factors, such as lowest cost, shortest time to completion, on-time completion, shortest waiting time, shortest travel distance, lowest fuel or power consumption, highest efficiency, and/or various other factors.

Although FIG. 2 illustrates an example remote driving system having a particular number, type, configuration, and arrangement of various components, other example embodiments may include various other numbers, types, configurations, and arrangements of the various components. For example, various other numbers of vehicles, teleoperators, and/or tasks may be present at any particular time, various types of wireless communication networks may be used to facilitate communication between vehicles, teleoperators, and the fleet management system, the fleet management system may comprise a plurality of fleet management systems that may be in communication with each other, various individual fleet management systems may optimize respective portions of the vehicles, teleoperators, and tasks, and/or various other modifications may be made in other example embodiments of the example remote driving system.

Figure 3:
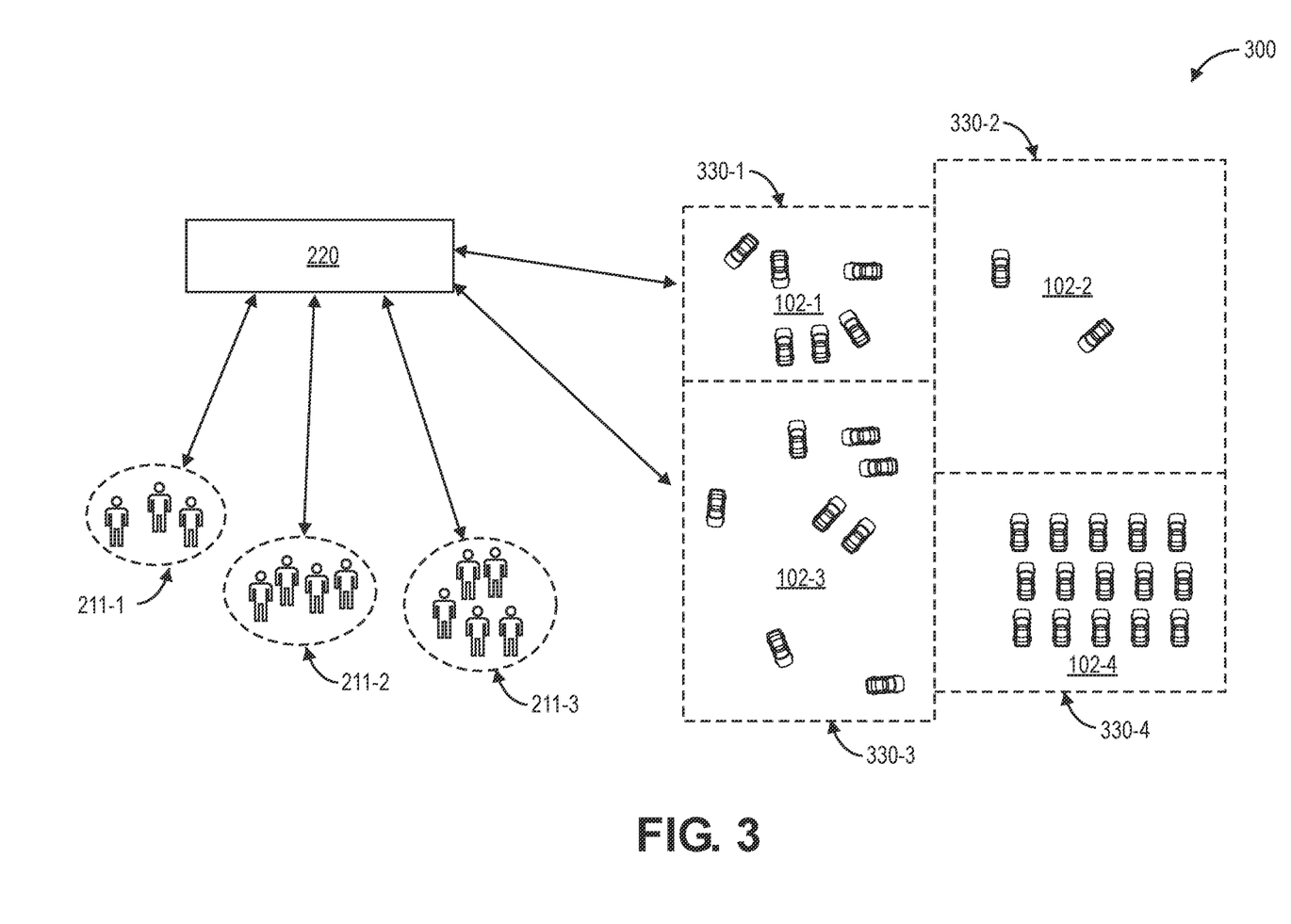
FIG. 3 is another schematic diagram of an example fleet management system for remote driving systems, in accordance with implementations of the present disclosure.

FIG. 3 is another schematic diagram 300 of an example fleet management system for remote driving system, in accordance with implementations of the present disclosure.

As shown in FIG. 3, a remote driving system may include a plurality of vehicles 102, a plurality of teleoperators 211, a plurality of tasks (not illustrated), and a fleet management or control system 220 that is in communication therewith via a wireless communication network (not illustrated). The example remote driving system of FIG. 3 may form a portion of, or may be one example of, the remote driving system of FIG. 2, and may also include any and all of the features described herein with respect to FIGS. 1 and 2.

In example embodiments, the plurality of teleoperators 211 may be positioned at respective teleoperator stations at different locations with an environment. For example, as shown in FIG. 3, a first group of teleoperators 211-1 may be positioned at a first location of teleoperator stations, a second group of teleoperators 211-2 may be positioned at a second location of teleoperator stations, and a third group of teleoperators 211-3 may be positioned at a third location of teleoperator stations. In addition, different numbers of teleoperators may be positioned at different locations, and the different locations may be remote or separate from each other, e.g., in different regions, areas, or zones within an environment. Moreover, the various teleoperators may have different availability, qualifications, or other aspects, such as operating licenses or certificates associated with different types of tasks, different working hours, shifts, breaks, vacations, or other aspects related to qualification or availability to perform one or more tasks.

In example embodiments, the plurality of vehicles 102 may be positioned at respective vehicle locations associated with different regions, areas, or zones 330 within an environment. For example, as shown in FIG. 3, a first group of vehicles 102-1 may be positioned at a first region 330-1, a second group of vehicles 102-2 may be positioned at a second region 330-2, a third group of vehicles 102-3 may be positioned at a third region 330-3, and a fourth group of vehicles 102-4 may be positioned at a fourth region 330-4. In addition, different numbers of vehicles may be positioned at different regions, and the different regions may be remote or separate from each other within an environment. Moreover, the various vehicles may have different availability, capabilities, or other aspects, such as passenger capacity, cargo capacity, range, or other aspects related to capability or availability to perform one or more tasks.

As described herein, the fleet management system 220 may receive data associated with vehicles 102, teleoperators 211, and tasks, and may process the received data to generate, optimize, assign, and/or allocate performance of the tasks to various combinations of vehicles and teleoperators, e.g., based on their availability, capabilities, qualifications, and/or other aspects. In some example embodiments, a single fleet management system 220 may coordinate and optimize performance of tasks by teleoperators with respect to vehicles.

In other example embodiments, the fleet management system 220 may comprise a plurality of fleet management systems that may each coordinate and optimize performance of a subset of tasks by a subset of teleoperators for a subset of vehicles. For example, as shown in FIG. 3, a first fleet management system may coordinate and optimize tasks to be completed by the first group of teleoperators 211-1 with respect to the first group of vehicles 102-1 in the first region 330-1. Similarly, other fleet management systems may coordinate and optimize tasks to be completed by other groups of teleoperators 211 with respect to other respective groups of vehicles 102 in respective regions 330.

In additional example embodiments, the plurality of fleet management systems may communicate with each other to optimize coordination and allocation of tasks among multiple groups of vehicles and multiple groups of teleoperators. Further, such coordination or handoff of allocation may also occur as vehicles move between different regions 330 within an environment, as teleoperators begin or end their working hours, breaks, etc., as tasks are received, processed, or completed, and/or in response to various other changes to vehicles, teleoperators, and/or tasks.

In further example embodiments, the individual groups of teleoperators 211 may be positioned in different time zones or geographical areas. As a result, if it is not working hours for a group of teleoperators in a first time zone or if a group of teleoperators is unavailable, a different group of teleoperators may be assigned to perform tasks with respect to various vehicles. In this manner, various groups of teleoperators may have rolling availability over time, such that the remote driving system may be substantially continuously coordinated and optimized.

In other example embodiments, the individual groups of vehicles 102 may also be positioned in different time zones or geographical areas. As a result, if the demand for remote driving operations is low in a first region but the demand is high in a second region, one or more teleoperators from a group of teleoperators may be allocated tasks with respect to vehicles in the second region to meet the high demand. Moreover, as demand shifts and changes over time with respect to different regions, e.g., based on standard working hours, expected commuting or travel times, seasonal changes, and/or others, various groups of teleoperators may be allocated tasks to meet high demand in different regions, thereby reducing idle time of teleoperators and increasing overall efficiency. In addition, vehicles may also be moved or reallocated to different areas by teleoperators in response to changes in demand, thereby further increasing overall efficiency.

Furthermore, although tasks can be allocated to teleoperators for vehicles as the demand arises, areas with historically or consistently low demand may also receive remote driving operations using the systems and methods described herein. Such areas may generally be underserved by conventional fleet services, such as taxi or carshare services, because of the high cost and low efficiency associated with conventional fleet management systems that require a driver to physically move to and operate a vehicle. However, using the systems and methods described herein, a teleoperator may remotely operate a vehicle in an area with generally low demand, with at least some or similar cost and efficiency improvements as those associated with performance of tasks in high demand areas.

Although FIG. 3 illustrates an example remote driving system having a particular number, type, configuration, and arrangement of various components, other example embodiments may include various other numbers, types, configurations, and arrangements of the various components. For example, various other groups, numbers, or types of vehicles and/or teleoperators may be associated with various locations, regions, areas, or zones, various numbers or types of tasks may be assigned to teleoperators and vehicles, various types of wireless communication networks may be used to facilitate communication between vehicles, teleoperators, and the fleet management system, the fleet management system may comprise a plurality of fleet management systems that may be in communication with each other, various individual fleet management systems may optimize respective groups, portions, or regions of vehicles and/or teleoperators, and/or various other modifications may be made in other example embodiments of the example remote driving system.

Figure 4A:
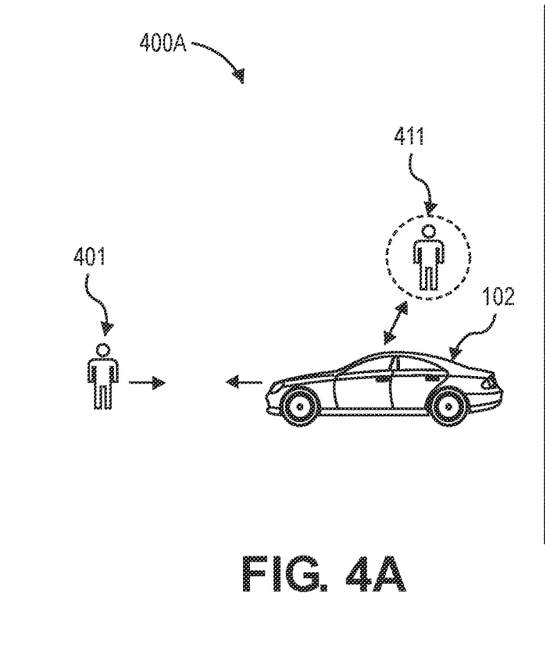
FIGS. 4A-4C are schematic diagrams of an example teleoperated taxi application enabled by the fleet management system for remote driving systems, in accordance with implementations of the present disclosure.
Figure 4B:
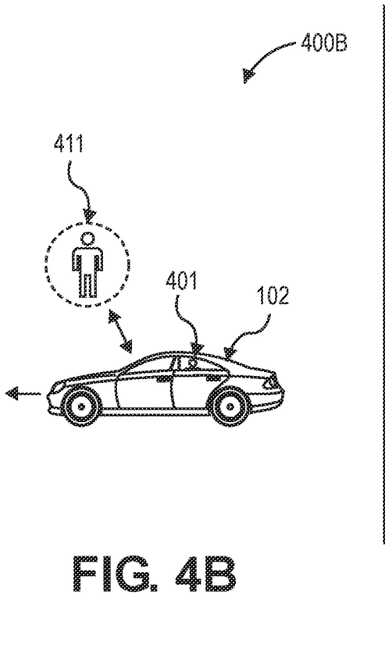
Figure 4C:
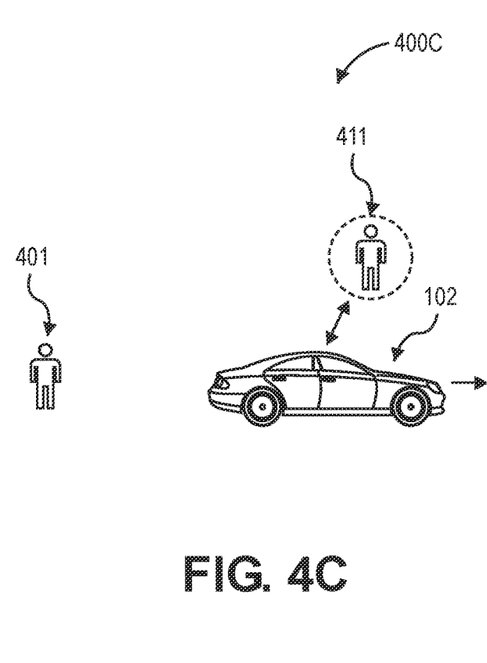

FIGS. 4A-4C are schematic diagrams 400A, 400B, 400C of an example teleoperated taxi application enabled by the fleet management system for remote driving systems, in accordance with implementations of the present disclosure.

As shown in FIG. 4A, a customer 401 at a customer location may provide, send, or input a request for taxi service to a remote driving system. In response to the request, a fleet management system may select a vehicle 102 and a teleoperator 411 to remotely operate the vehicle 102 to provide the requested taxi service. The teleoperator 411 may then connect with the vehicle 102, and remotely drive the vehicle 102 toward the customer 401 at the customer location.

Then, as shown in FIG. 4B, when the vehicle 102 that is remotely operated by the teleoperator 411 arrives at the customer location to pick up the customer 401, the customer 401 may enter the vehicle 102. Upon picking up the customer 401, the teleoperator 411 may then remotely drive the vehicle 102 with the customer 401 to a destination location provided by the customer 401, thereby providing the requested taxi service.

Further, as shown in FIG. 4C, when the vehicle 102 that is remotely operated by the teleoperator 411 arrives at the destination location to drop off the customer 401, the customer 401 may exit the vehicle 102. Upon dropping off the customer 401, the teleoperator 411 may then remotely drive the vehicle 102 to a parking or storage location to park or leave the vehicle 102. Alternatively, the teleoperator 411 may remotely drive the vehicle 102 to perform another task, such as picking up another customer, replenishing fuel or power, repairing or maintaining the vehicle, and/or various other tasks. Finally, the teleoperator 411 may then disconnect from the vehicle 102, such that the vehicle 102 may be available for future remote driving operations.

Figure 5:
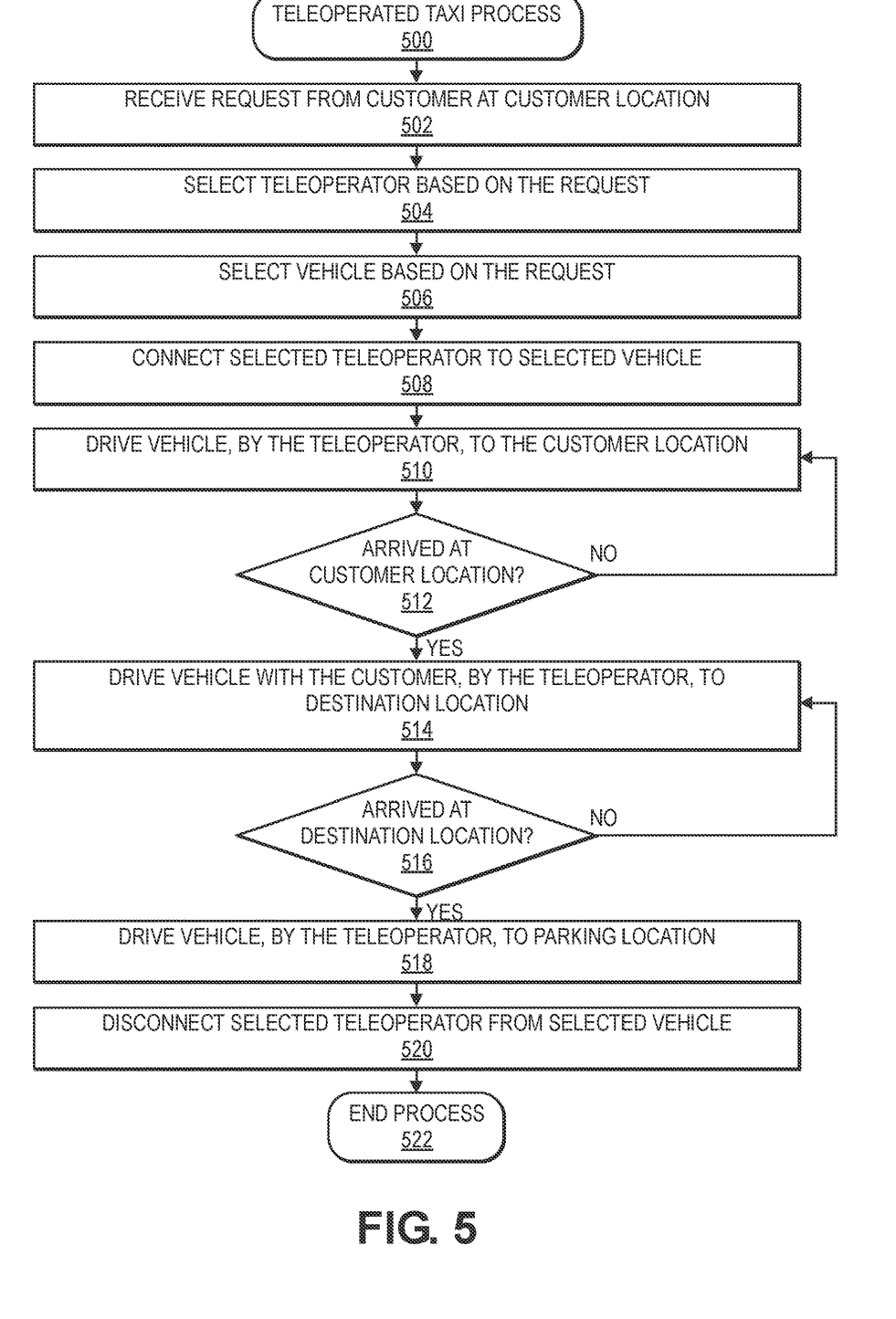
FIG. 5 is a flow diagram illustrating an example teleoperated taxi process, in accordance with implementations of the present disclosure.

FIG. 5 is a flow diagram illustrating an example teleoperated taxi process 500, in accordance with implementations of the present disclosure.

The process 500 may begin by receiving a request from a customer at a customer location, as at 502. For example, the customer may submit a request to a remote driving system, e.g., via a mobile device, computer, telephone, or other method. The request may relate to various different types of tasks that may be performed by a remote driving system, e.g., taxi service or others. Further, a fleet management or control system may receive the request from the customer.

The process 500 may continue by selecting a teleoperator based on the request, as at 504. For example, the request may relate to one or more of a plurality of tasks. In the example of a taxi service, the request may comprise various tasks, including driving to a customer location, driving to a destination location, driving to a parking or storage location, and/or other tasks. In some example embodiments, a single teleoperator may be selected to perform the plurality of tasks related to the request. In other example embodiments, one or more teleoperators may be selected to perform respective one or more of the plurality of tasks related to the request. In addition, a teleoperator may be selected based on availability, qualifications, or other aspects of the teleoperator. Further, a fleet management or control system may select one or more teleoperators to perform respective tasks based on the request.

The process 500 may proceed by selecting a vehicle based on the request, as at 506. For example, the request may relate to one or more of a plurality of tasks. In some example embodiments, such as the example of a taxi service, a single vehicle may be selected to perform the plurality of tasks related to the request. In other example embodiments, such as for example other types of requests, one or more vehicles may be selected to perform respective one or more of the plurality of tasks related to the request. In addition, a vehicle may be selected based on availability, capabilities, or other aspects of the vehicle. Further, a fleet management or control system may select one or more vehicles to perform respective tasks based on the request.

The process 500 may continue to connect the selected teleoperator to the selected vehicle, as at 508. For example, a selected teleoperator at a teleoperator station may connect or establish a communication connection with a selected vehicle via a wireless communication network. Various types of networks, connection protocols, and/or communication methods may be used to enable sending and receiving data between the teleoperator station and the vehicle. In various example embodiments, a teleoperator may substantially independently initiate connection with a vehicle, a teleoperator may initiate connection with a vehicle based on data, information, or recommendations from a control system, a control system may initiate connection between a teleoperator and a vehicle with teleoperator confirmation, and/or a control system may substantially automatically initiate connection between a teleoperator and a vehicle. The teleoperator station may be configured to receive imaging data, drive state information, and/or other data from the vehicle via the network, and the vehicle may be configured to receive drive control commands and/or other data from the teleoperator station via the network. Further, a fleet management or control system may instruct connection or establish a communication connection between the selected teleoperator and the selected vehicle.

The process 500 may proceed to drive the vehicle, by the teleoperator, to the customer location, as at 510. For example, the teleoperator may remotely drive or operate the vehicle via the network, and the teleoperator may perform various tasks that have been assigned or allocated to the teleoperator and vehicle. In the example of a taxi service, the teleoperator may remotely drive the vehicle to the customer location to pick up the customer. Further, a fleet management or control system may instruct remote operation of the vehicle by the teleoperator to the customer location.

The process 500 may then continue with determining whether the vehicle has arrived at the customer location, as at 512. For example, various location sensors onboard the vehicle may receive and transmit data associated with a current location of the vehicle. In addition, a teleoperator may provide an input at the teleoperator station that indicates a current location of the vehicle, e.g., arrival at the customer location. Further, a fleet management or control system may determine whether the vehicle has arrived at the customer location.

If the vehicle has not arrived at the customer location, the process 500 may return to step 510 to continue to remotely operate the vehicle, by the teleoperator, to the customer location. If, however, the vehicle has arrived at the customer location, the process 500 may proceed with driving the vehicle with the customer, by the teleoperator, to a destination location, as at 514. For example, at the customer location, the customer may enter the vehicle. Then, the teleoperator may remotely drive or operate the vehicle via the network, and the teleoperator may perform one or more tasks that have been assigned or allocated to the teleoperator and vehicle. In the example of a taxi service, the teleoperator may remotely drive the vehicle with the customer to a destination location requested by the customer. Further, a fleet management or control system may instruct remote operation of the vehicle with the customer by the teleoperator to the destination location.

The process 500 may then continue by determining whether the vehicle has arrived at the destination location, as at 516. For example, various location sensors onboard the vehicle may receive and transmit data associated with a current location of the vehicle. In addition, a teleoperator may provide an input at the teleoperator station that indicates a current location of the vehicle, e.g., arrival at the destination location. Further, a fleet management or control system may determine whether the vehicle has arrived at the destination location.

If the vehicle has not arrived at the destination location, the process 500 may return to step 514 to continue to remotely operate the vehicle with the customer, by the teleoperator, to the destination location. If, however, the vehicle has arrived at the destination location, the process 500 may proceed by driving the vehicle, by the teleoperator, to a parking location, as at 518. For example, at the destination location, the customer may exit the vehicle. Then, the teleoperator may remotely drive or operate the vehicle via the network, and the teleoperator may perform one or more tasks that have been assigned or allocated to the teleoperator and vehicle. In the example of a taxi service, the teleoperator may remotely drive the vehicle to a parking or storage location. Alternatively, the teleoperator may continue to remotely drive the vehicle to perform one or more other tasks, e.g., picking up another customer, replenishing fuel or power, repairing or maintaining the vehicle, and/or various other tasks. Further, a fleet management or control system may instruct remote operation of the vehicle by the teleoperator to the parking location.

The process 500 may then continue to disconnect the selected teleoperator from the selected vehicle, as at 520. For example, upon completing one or more tasks with respect to the selected vehicle, a selected teleoperator at a teleoperator station may disconnect or terminate a communication connection with a selected vehicle via a wireless communication network. The disconnection may end the transfer of data between the selected teleoperator and selected vehicle. In addition, the selected vehicle may then await connection by another selected teleoperator to perform one or more other tasks. In various example embodiments, a teleoperator may substantially independently initiate disconnection from a vehicle, a teleoperator may initiate disconnection from a vehicle based on data, information, or recommendations from a control system, a control system may initiate disconnection between a teleoperator and a vehicle with teleoperator confirmation, and/or a control system may substantially automatically initiate disconnection between a teleoperator and a vehicle. Further, a fleet management or control system may instruct disconnection or terminate a communication connection between the selected teleoperator and the selected vehicle.

The process 500 may then end, as at 522.

Figure 6A:
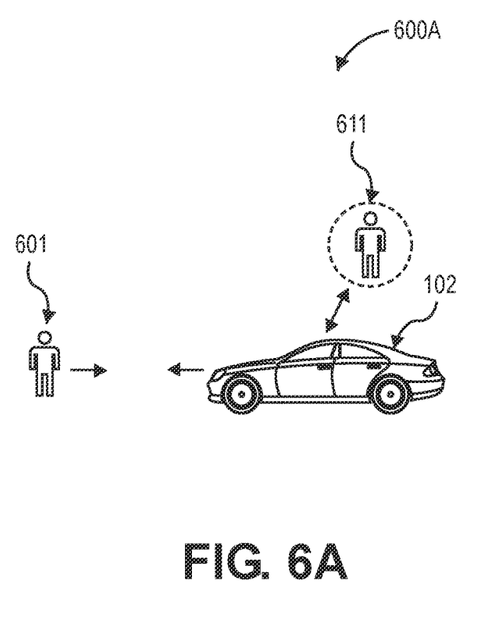
FIGS. 6A-6C are schematic diagrams of an example teleoperated carshare application enabled by the fleet management system for remote driving systems, in accordance with implementations of the present disclosure.
Figure 6B:
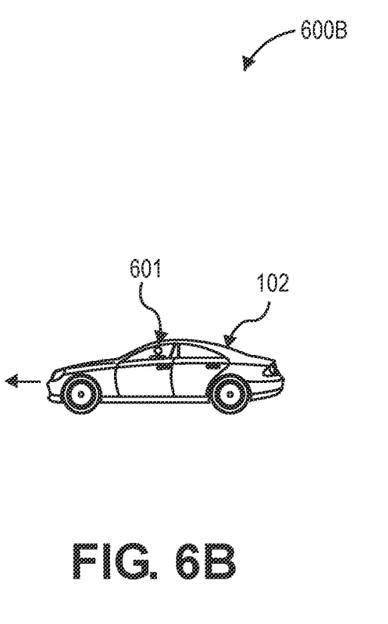
Figure 6C:
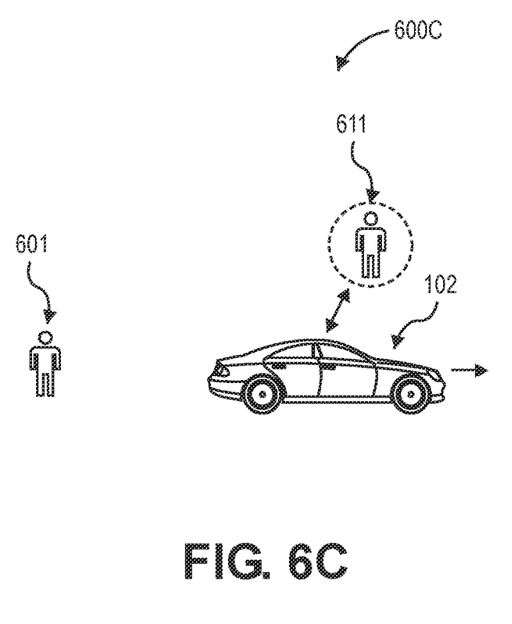

FIGS. 6A-6C are schematic diagrams 600A, 600B, 600C of an example teleoperated carshare application enabled by the fleet management system for remote driving systems, in accordance with implementations of the present disclosure.

As shown in FIG. 6A, a customer 601 at a customer location may provide, send, or input a request for carshare service to a remote driving system. In response to the request, a fleet management system may select a vehicle 102 and a teleoperator 611 to remotely operate the vehicle 102 to provide the requested carshare service. The teleoperator 611 may then connect with the vehicle 102, and remotely drive the vehicle 102 toward the customer 601 at the customer location.

In some example embodiments, a carshare service may be provided to customers in scenarios in which a vehicle may be available for use by a customer, but a teleoperator may not be available to provide a taxi service. In addition, in some scenarios, the fleet management system may select a vehicle that is proximate or close to the customer location, e.g., a pickup location, and the customer may walk or travel to the pickup location at which the vehicle is positioned, without requiring any remote operation of the vehicle by a teleoperator to move the vehicle closer to the customer location.

Then, as shown in FIG. 6B, when the vehicle 102 is proximate the customer 601, e.g., the vehicle 102 was remotely driven by a teleoperator to the customer location, and/or the customer 601 walked or traveled toward the vehicle 102 at a pickup location, the customer 601 may enter the vehicle 102. Upon entering the vehicle 102, the customer 601 may be authorized to operate the vehicle 102 to a destination location, thereby providing the requested carshare service. The customer 601 may be authorized by various methods, e.g., by providing, sending, or inputting a passcode, authorization code, or other identifier or code in order to operate the vehicle.

Further, as shown in FIG. 6C, when the customer 601 operates the vehicle 102 and arrives at the destination location, the customer 601 may exit the vehicle 102. Upon exiting the vehicle 102, the vehicle 102 may remain at its current location, e.g., a parking or storage location, until the vehicle 102 is selected for another task by the fleet management system. Alternatively, a teleoperator 611 may then connect to and remotely drive the vehicle 102 to perform various other tasks, such as picking up another customer, replenishing fuel or power, driving to a parking or storage location, repairing or maintaining the vehicle, and/or various other tasks. Finally, the teleoperator 611 may then disconnect from the vehicle 102, such that the vehicle 102 may be available for future remote driving operations.

Figure 7:
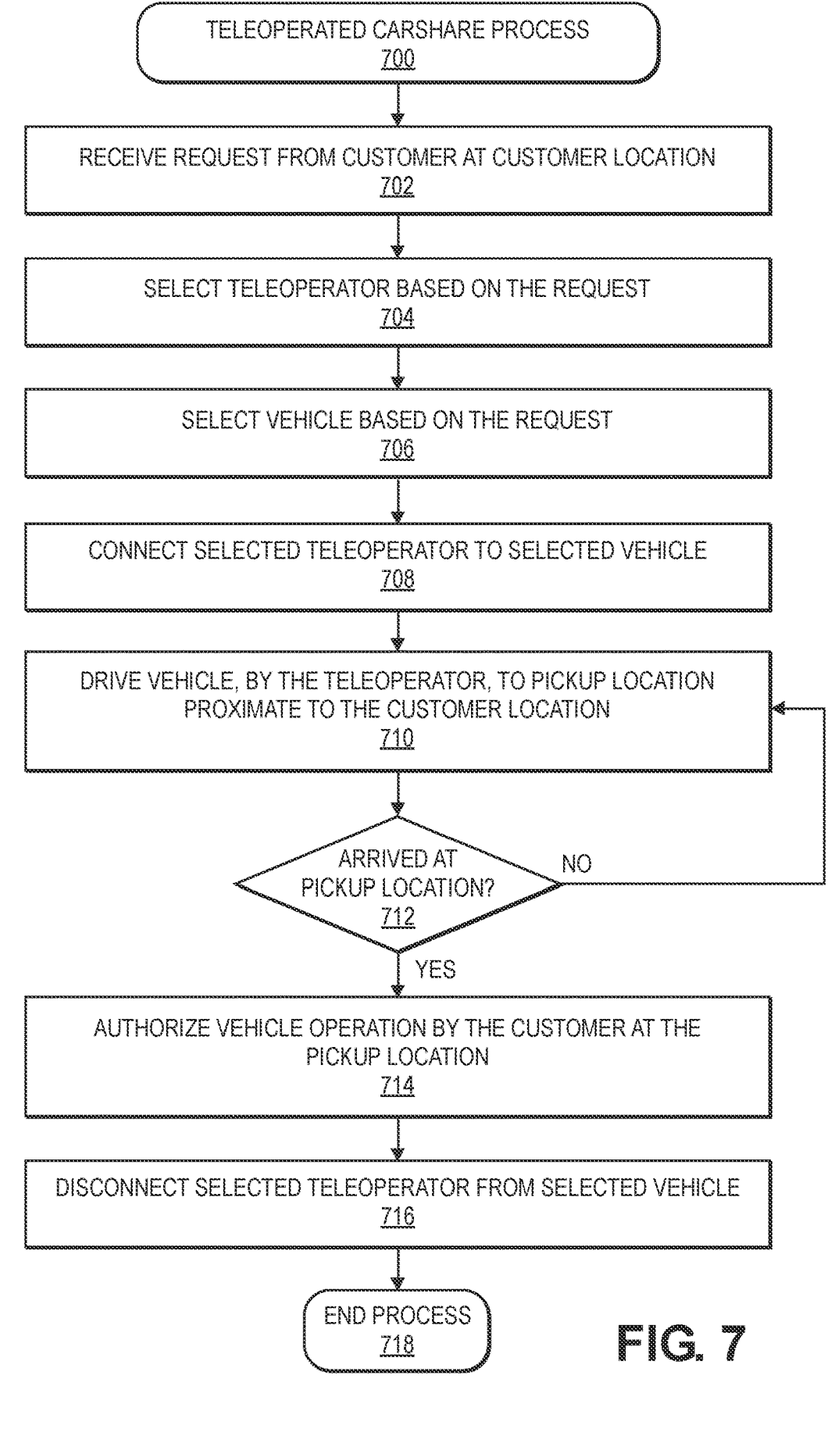
FIG. 7 is a flow diagram illustrating an example teleoperated carshare process, in accordance with implementations of the present disclosure.

FIG. 7 is a flow diagram illustrating an example teleoperated carshare process 700, in accordance with implementations of the present disclosure.

The process 700 may begin by receiving a request from a customer at a customer location, as at 702. For example, the customer may submit a request to a remote driving system, e.g., via a mobile device, computer, telephone, or other method. The request may relate to various different types of tasks that may be performed by a remote driving system, e.g., carshare service, taxi service, or others. Further, a fleet management or control system may receive the request from the customer.

The process 700 may continue by selecting a teleoperator based on the request, as at 704. For example, the request may relate to one or more of a plurality of tasks. In the example of a carshare service, the request may comprise various tasks, including driving to a customer location, driving to a parking or storage location, and/or other tasks. In some example embodiments, a single teleoperator may be selected to perform the plurality of tasks related to the request. In other example embodiments, one or more teleoperators may be selected to perform respective one or more of the plurality of tasks related to the request. In addition, a teleoperator may be selected based on availability, qualifications, or other aspects of the teleoperator. Further, a fleet management or control system may select one or more teleoperators to perform respective tasks based on the request.

The process 700 may proceed by selecting a vehicle based on the request, as at 706. For example, the request may relate to one or more of a plurality of tasks. In some example embodiments, such as the example of a carshare service, a single vehicle may be selected to perform the plurality of tasks related to the request. In other example embodiments, such as for example other types of requests, one or more vehicles may be selected to perform respective one or more of the plurality of tasks related to the request. In addition, a vehicle may be selected based on availability, capabilities, or other aspects of the vehicle. Further, a fleet management or control system may select one or more vehicles to perform respective tasks based on the request.

The process 700 may continue to connect the selected teleoperator to the selected vehicle, as at 708. For example, a selected teleoperator at a teleoperator station may connect or establish a communication connection with a selected vehicle via a wireless communication network. Various types of networks, connection protocols, and/or communication methods may be used to enable sending and receiving data between the teleoperator station and the vehicle. In various example embodiments, a teleoperator may substantially independently initiate connection with a vehicle, a teleoperator may initiate connection with a vehicle based on data, information, or recommendations from a control system, a control system may initiate connection between a teleoperator and a vehicle with teleoperator confirmation, and/or a control system may substantially automatically initiate connection between a teleoperator and a vehicle. The teleoperator station may be configured to receive imaging data, drive state information, and/or other data from the vehicle via the network, and the vehicle may be configured to receive drive control commands and/or other data from the teleoperator station via the network. Further, a fleet management or control system may instruct connection or establish a communication connection between the selected teleoperator and the selected vehicle.

The process 700 may proceed to drive the vehicle, by the teleoperator, to a pickup location proximate the customer location, as at 710. For example, the teleoperator may remotely drive or operate the vehicle via the network, and the teleoperator may perform various tasks that have been assigned or allocated to the teleoperator and vehicle. In the example of a carshare service, the teleoperator may remotely drive the vehicle to a pickup location proximate the customer location to hand off operation to the customer. Further, a fleet management or control system may instruct remote operation of the vehicle by the teleoperator to the customer location.

The process 700 may then continue with determining whether the vehicle has arrived at the pickup location, as at 712. For example, various location sensors onboard the vehicle may receive and transmit data associated with a current location of the vehicle. In addition, a teleoperator may provide an input at the teleoperator station that indicates a current location of the vehicle, e.g., arrival at the pickup location. Further, a fleet management or control system may determine whether the vehicle has arrived at the pickup location.

If the vehicle has not arrived at the pickup location, the process 700 may return to step 710 to continue to remotely operate the vehicle, by the teleoperator, to the pickup location. If, however, the vehicle has arrived at the pickup location, the process 700 may proceed with authorizing vehicle operation by the customer at the pickup location, as at 714. For example, at the pickup location, the customer may enter the vehicle. The customer may be authorized to operate the vehicle by various methods, e.g., by providing, sending, or inputting a passcode, authorization code, or other identifier or code in order to operate the vehicle. Then, the customer may drive or operate the vehicle to a destination location determined by the customer. Further, a fleet management or control system may authorize operation of the vehicle by the customer at the pickup location.

As described herein, in some example embodiments, a carshare service may be provided to customers in scenarios in which a vehicle may be available for use by a customer, but a teleoperator may not be available to provide a taxi service or other portions of a carshare service. In addition, in some carshare scenarios, the fleet management system may select a vehicle that is proximate or close to the customer location, e.g., the pickup location, and the customer may walk or travel to the pickup location at which the vehicle is positioned, without requiring any selection of a teleoperator, connection between the teleoperator and the vehicle, or remote operation of the vehicle by the teleoperator to move the vehicle closer to the customer location. Further, upon arriving at the pickup location and/or upon entering the vehicle, the customer may be authorized for operation of the vehicle, as described herein at least with respect to step 714.

In scenarios in which a teleoperator has connected to and remotely operated the vehicle to facilitate the carshare service, the process 700 may then continue to disconnect the selected teleoperator from the selected vehicle, as at 716. For example, upon completing one or more tasks with respect to the selected vehicle, a selected teleoperator at a teleoperator station may disconnect or terminate a communication connection with a selected vehicle via a wireless communication network. The disconnection may end the transfer of data between the selected teleoperator and selected vehicle. In addition, the selected vehicle may then await connection by another selected teleoperator to perform one or more other tasks. In various example embodiments, a teleoperator may substantially independently initiate disconnection from a vehicle, a teleoperator may initiate disconnection from a vehicle based on data, information, or recommendations from a control system, a control system may initiate disconnection between a teleoperator and a vehicle with teleoperator confirmation, and/or a control system may substantially automatically initiate disconnection between a teleoperator and a vehicle. Further, a fleet management or control system may instruct disconnection or terminate a communication connection between the selected teleoperator and the selected vehicle.

The process 700 may then end, as at 718.

Figure 8:
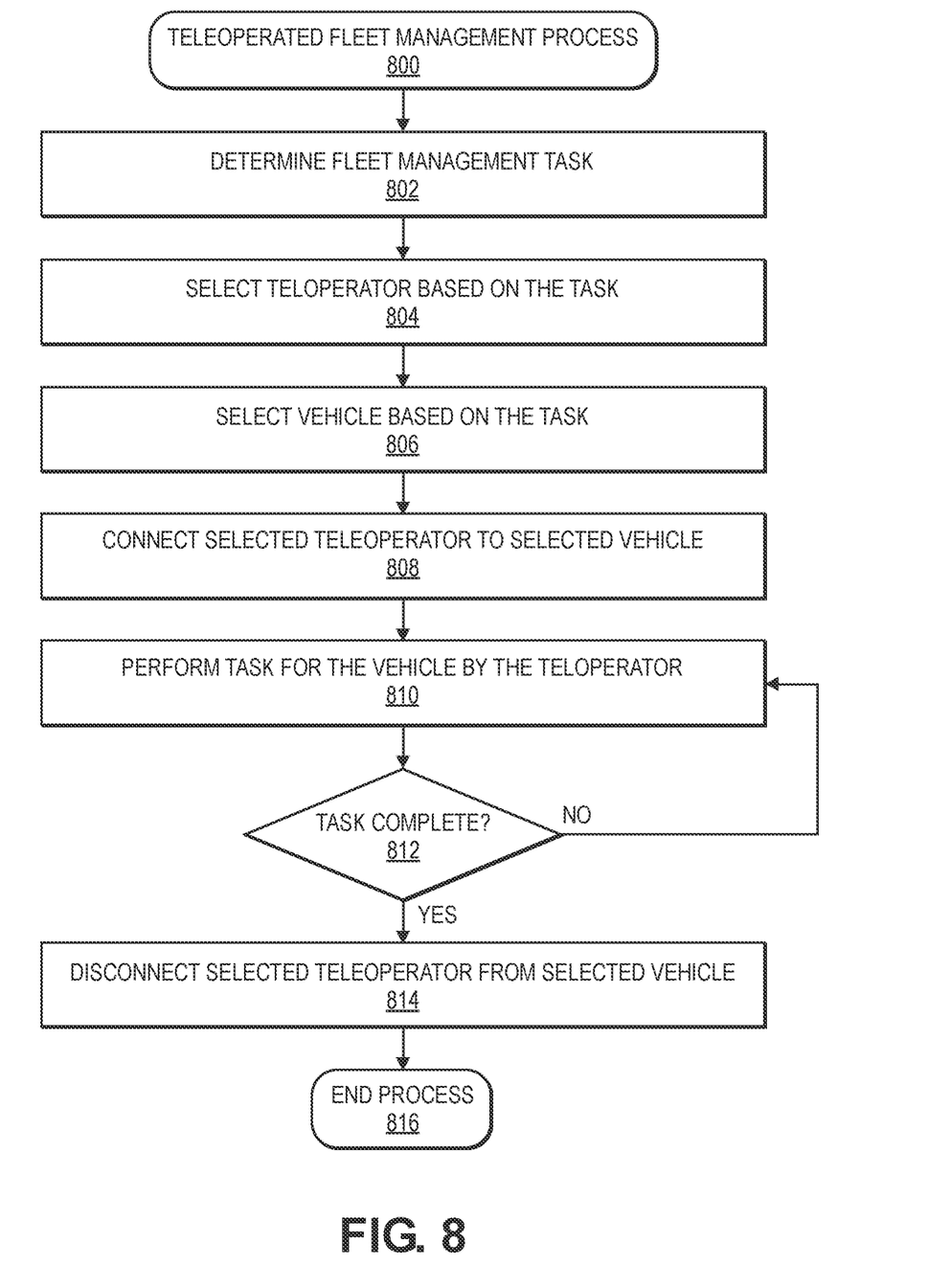
FIG. 8 is a flow diagram illustrating an example teleoperated fleet management process, in accordance with implementations of the present disclosure.

FIG. 8 is a flow diagram illustrating an example teleoperated fleet management process 800, in accordance with implementations of the present disclosure.

The process 800 may begin by determining a fleet management task, as at 802. For example, the fleet management task may comprise various tasks that are not directly connected or related to requests received from customers, individuals, clients, or other entities or systems to utilize the remote driving system. The fleet management tasks may include various types of remote driving operations, such as driving to a parking or storage location, driving to a potential pickup location, driving to a repair or maintenance location, driving to a power replenishment location, rebalancing or redistributing one or more vehicles within an environment to meet or anticipate demand, driving between any two locations in an environment, and/or various other types of fleet management tasks. In some example embodiments, various fleet management tasks may be less time-sensitive than requests for various remote driving operations received from customers, and therefore, the fleet management tasks may have lower priority and/or may be performed after more urgent or higher priority tasks have been assigned, instructed, or completed. Further, a fleet management or control system may determine a fleet management task to be performed.

The process 800 may continue by selecting a teleoperator based on the task, as at 804. For example, the task may relate to one or more of a plurality of tasks. In various examples, the task may comprise remote operation or driving of a vehicle to manage or maintain the fleet of vehicles, as well as to meet or anticipate demand for remote driving operations in an environment. In some example embodiments, a single teleoperator may be selected to perform the plurality of tasks related to the tasks. In other example embodiments, one or more teleoperators may be selected to perform respective one or more of the plurality of tasks related to the task. In addition, a teleoperator may be selected based on availability, qualifications, or other aspects of the teleoperator. Further, a fleet management or control system may select one or more teleoperators to perform respective tasks based on the task.

The process 800 may proceed by selecting a vehicle based on the task, as at 806. For example, the task may relate to one or more of a plurality of tasks. In various examples, a single vehicle may be selected for remote operation to manage or maintain the fleet of vehicles, as well as to meet or anticipate demand for remote driving operations in an environment. In other examples, a plurality of vehicles may be selected for remote operation to manage or maintain the fleet of vehicles, as well as to meet or anticipate demand for remote driving operations in an environment. In addition, a vehicle may be selected based on availability, capabilities, or other aspects of the vehicle. Further, a fleet management or control system may select one or more vehicles to perform respective tasks based on the task.

The process 800 may continue to connect the selected teleoperator to the selected vehicle, as at 808. For example, a selected teleoperator at a teleoperator station may connect or establish a communication connection with a selected vehicle via a wireless communication network. Various types of networks, connection protocols, and/or communication methods may be used to enable sending and receiving data between the teleoperator station and the vehicle. In various example embodiments, a teleoperator may substantially independently initiate connection with a vehicle, a teleoperator may initiate connection with a vehicle based on data, information, or recommendations from a control system, a control system may initiate connection between a teleoperator and a vehicle with teleoperator confirmation, and/or a control system may substantially automatically initiate connection between a teleoperator and a vehicle. The teleoperator station may be configured to receive imaging data, drive state information, and/or other data from the vehicle via the network, and the vehicle may be configured to receive drive control commands and/or other data from the teleoperator station via the network. Further, a fleet management or control system may instruct connection or establish a communication connection between the selected teleoperator and the selected vehicle.

The process 800 may proceed to perform the task for the vehicle by the teleoperator, as at 810. For example, the teleoperator may remotely drive or operate the vehicle via the network, and the teleoperator may perform various tasks that have been assigned or allocated to the teleoperator and vehicle. In various examples, the teleoperator may remotely operate the vehicle to manage or maintain the fleet of vehicles, as well as to meet or anticipate demand for remote driving operations in an environment. Further, a fleet management or control system may instruct remote operation of the vehicle by the teleoperator to perform the task.

The process 800 may then continue with determining whether the task is complete, as at 812. For example, various location sensors onboard the vehicle may receive and transmit data associated with a current location of the vehicle. In addition, a teleoperator may provide an input at the teleoperator station that indicates a current location of the vehicle and/or a current status of the task with respect to the vehicle. Further, a fleet management or control system may determine whether the task is complete.

If the task is not complete, the process 800 may return to step 810 to continue to perform the task for the vehicle by the teleoperator. If, however, the task is complete, the process 800 may proceed with disconnecting the selected teleoperator from the selected vehicle, as at 814. For example, upon completing one or more tasks with respect to the selected vehicle, a selected teleoperator at a teleoperator station may disconnect or terminate a communication connection with a selected vehicle via a wireless communication network. The disconnection may end the transfer of data between the selected teleoperator and selected vehicle. In addition, the selected vehicle may then await connection by another selected teleoperator to perform one or more other tasks. In various example embodiments, a teleoperator may substantially independently initiate disconnection from a vehicle, a teleoperator may initiate disconnection from a vehicle based on data, information, or recommendations from a control system, a control system may initiate disconnection between a teleoperator and a vehicle with teleoperator confirmation, and/or a control system may substantially automatically initiate disconnection between a teleoperator and a vehicle. Further, a fleet management or control system may instruct disconnection or terminate a communication connection between the selected teleoperator and the selected vehicle.

The process 800 may then end, as at 816.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5, 7, and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to perform a remote driving operation, comprising:
    receiving, by a fleet management system, a request from a customer at a customer location;
    selecting, by the fleet management system, a teleoperator at a teleoperator station based on the request and at least one of cost, time, or efficiency with respect to performance of the request;
    selecting, by the fleet management system, a vehicle based on the request and at least one of cost, time, or efficiency with respect to performance of the request;
    connecting, by the fleet management system, the teleoperator with the vehicle;
    instructing, by the fleet management system, remote operation of the vehicle by the teleoperator toward the customer location, wherein the vehicle moves toward the customer location responsive to the remote operation by the teleoperator;
    at least one of:
        instructing, by the fleet management system, remote operation of the vehicle by the teleoperator with the customer from the customer location to a destination location, or
        authorizing, by the fleet management system, operation of the vehicle by the customer from the customer location to the destination location; and
    disconnecting, by the fleet management system, the teleoperator from the vehicle.

2. The method of claim 1, further comprising:
    instructing, by the fleet management system, remote operation of the vehicle by the teleoperator to a parking location prior to disconnecting the teleoperator from the vehicle.

3. The method of claim 1, wherein the vehicle is at a vehicle location with an environment.

4. The method of claim 3, wherein the teleoperator station is remote from the customer location and the vehicle location.

5. A method, comprising:
    receiving, by a control system, a task;
    selecting, by the control system, a teleoperator at a teleoperator station based on the task and at least one of cost, time, or efficiency with respect to performance of the task;
    selecting, by the control system, a vehicle based on the task and at least one of cost, time, or efficiency with respect to performance of the task;
    connecting, by the control system, the teleoperator with the vehicle; and
    instructing, by the control system, remote operation of the vehicle by the teleoperator to perform the task;
    wherein the vehicle performs the task responsive to the remote operation by the teleoperator.

6. The method of claim 5, wherein the teleoperator station is remote from a vehicle location of the vehicle.

7. The method of claim 5, wherein the teleoperator is selected from among a plurality of teleoperators located at respective teleoperator stations within an environment.

8. The method of claim 7, wherein the vehicle is selected from among a plurality of vehicles located at respective vehicle locations within the environment.

9. The method of claim 8, wherein the task is one of a plurality of tasks to be performed by the plurality of teleoperators with respect to the plurality of vehicles.

10. The method of claim 9, wherein the plurality of tasks comprise at least one of driving to a customer location, driving to a pickup location, driving to a destination location, driving to a parking location, driving to a power replenishment location, driving to a repair or maintenance location, or driving to rebalance at least some of the plurality of vehicles.

11. The method of claim 9, wherein the plurality of tasks comprise at least one of a task to be completed by the teleoperator, a task to be completed by a customer in the vehicle, or a task to be at least partially autonomously performed by the vehicle.

12. The method of claim 5, wherein the teleoperator is selected based on at least one of availability or qualifications of the teleoperator with respect to performance of the task; and wherein the vehicle is selected based on at least one of availability or capabilities of the vehicle with respect to performance of the task.

13. The method of claim 5, wherein the control system comprises a plurality of control systems associated with respective regions of an environment;

wherein the respective regions of the environment include respective pluralities of teleoperators located at respective teleoperator stations; and wherein the respective regions of the environment include respective pluralities of vehicles located at respective vehicle locations.

14. The method of claim 5, further comprising:

determining, by the control system, that the task is complete; and disconnecting, by the control system, the teleoperator from the vehicle.

15. A remote driving system, comprising:

a plurality of vehicles at respective vehicle locations;

a plurality of teleoperators at respective teleoperator stations;

a plurality of tasks to be performed by the plurality of teleoperators with respect to the plurality of vehicles; and a control system in communication with the plurality of vehicles and the plurality of teleoperators via a communication network, the control system configured to at least:

select a task from among the plurality of tasks;

select a teleoperator from among the plurality of teleoperators based on the task and at least one of cost, time, or efficiency with respect to performance of the task;

select a vehicle from among the plurality of vehicles based on the task and at least one of cost, time, or efficiency with respect to performance of the task;

connect the teleoperator with the vehicle; and instruct remote operation of the vehicle by the teleoperator to perform the task;

wherein the vehicle performs the task responsive to the remote operation by the teleoperator.

16. The remote driving system of claim 15, wherein the vehicle locations are positioned at a plurality of regions within an environment.

17. The remote driving system of claim 15, wherein the teleoperator stations are positioned at a plurality of regions within the environment.

18. The remote driving system of claim 15, wherein the control system is further configured to at least:

determine that the task is complete; and responsive to determining that the task is complete, disconnect the teleoperator from the vehicle.

19. The remote driving system of claim 15, wherein the control system is further configured to at least:

select a second task from among the plurality of tasks;

select a second teleoperator from among the plurality of teleoperators based on the second task;

select the vehicle from among the plurality of vehicles based on the second task;

connect the second teleoperator with the vehicle; and instruct remote operation of the vehicle by the second teleoperator to perform the second task.

* * * * *